United States Patent [19]

Kudo et al.

[11] Patent Number: 4,769,295
[45] Date of Patent: Sep. 6, 1988

[54] BATTERY AND SWITCH TO BE MOUNTED ON VEHICLES

[75] Inventors: Masayuki Kudo, Shiki; Nobuo Miura, Wako; Yoshiteru Nakatake, Miyazaki, all of Japan

[73] Assignees: Honda Giken Kogyo Kabushiki Kaisha, Tokyo; Honda Manufacturing Co., Ltd., Miyazaki, both of Japan

[21] Appl. No.: 95,201

[22] Filed: Sep. 11, 1987

Related U.S. Application Data

[62] Division of Ser. No. 875,903, Jun. 19, 1987, abandoned.

[30] Foreign Application Priority Data

Jun. 20, 1985 [JP] Japan .................. 60-135166
Oct. 17, 1985 [JP] Japan .................. 60-232111

[51] Int. Cl.⁴ .............................................. H01M 2/00
[52] U.S. Cl. ........................................ 429/7; 429/121
[58] Field of Search .............................. 429/7, 61, 121

[56] References Cited

U.S. PATENT DOCUMENTS

| | | |
|---|---|---|
| 964,995 | 7/1910 | Marko . |
| 2,290,768 | 7/1942 | Sager .................. 429/121 |
| 4,600,664 | 7/1986 | Cramer et al. . |

FOREIGN PATENT DOCUMENTS

| | | |
|---|---|---|
| 4952472 | 6/1974 | Australia . |
| B82320 | 10/1982 | Australia . |
| 0113825 | 7/1984 | European Pat. Off. . |

*Primary Examiner*—Donald L. Walton
*Attorney, Agent, or Firm*—Armstrong, Nikaido, Marmelstein & Kubovcik

[57] ABSTRACT

One feature of the present invention is a battery to be mounted on a vehicle, in which the battery casing is formed with a recess into which a starter magnetic switch is fitted. Another feature of the invention is a starter magnetic switch which can be fitted into the recess formed in the battery. The starter magnetic switch has a rocker means which is made of a conductive material. The rocker means has a moving electric contact which is biased normally open and which is closed when the solenoids built into the switch are energized, to close the drive circuit of a starter motor. The rocking means has one end projecting to the outside of a switch casing and is fastened to the positive terminal of the battery. In addition, a supporting means, which projects to the outside of the switch casing at the side opposed to the portion where the rocking means projects, is fastened to the negative terminal of the battery. The rocking means is arranged such that the portion fastened to the positive terminal of the battery and the portion to be attracted by the solenoids are offset while holding a generally parallel relationship not in a common plane.

4 Claims, 5 Drawing Sheets

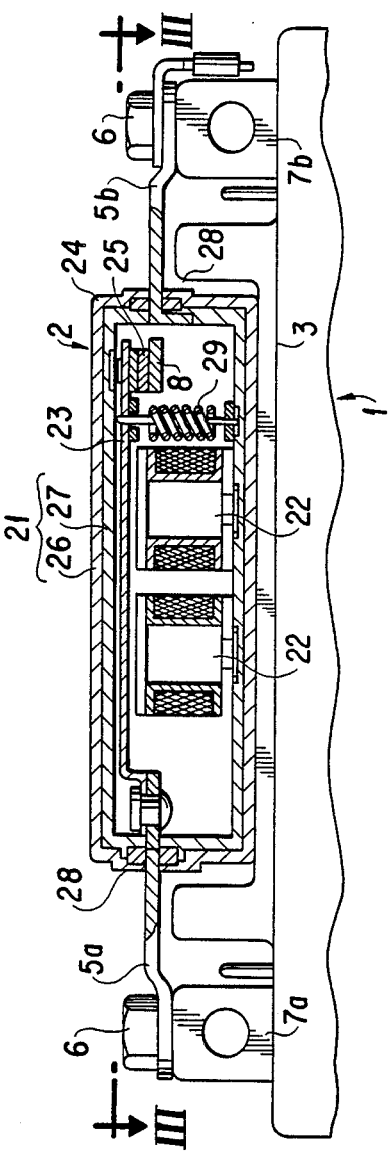
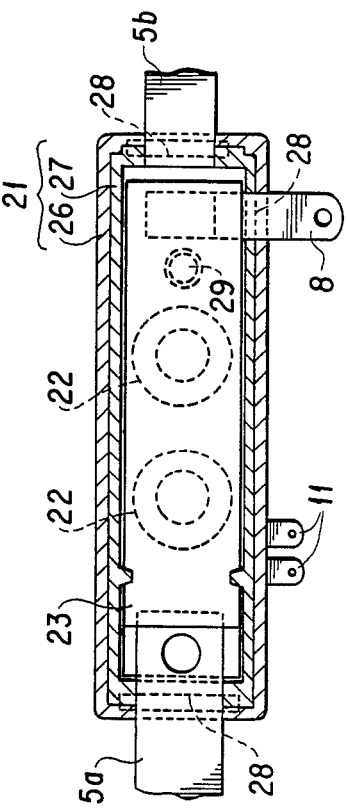

BATTERY AND SWITCH TO BE MOUNTED ON VEHICLES

This is a division of application Ser. No. 875,903, filed June 19, 1987, now abandoned.

FIELD OF THE INVENTION

The present invention relates to a battery to be mounted on a vehicle such as a motorcycle. The battery casing is formed with a recess into which a starter magnetic switch is fitted.

BACKGROUND OF THE INVENTION

In a motorcycle of the type having its engine started by means of a self-starter, a starter magnetic switch is operated by actuating a starter button mounted on a handle so that the self-starter is electrically connected with a battery to start the engine.

Ordinarily, the starter magnetic switch is disposed in suitable position through a vibration preventing member such that the switch is free from any interference with engine accessory parts. For example, the switch may be located between the carburetor and the air cleaner or at the back of the air cleaner.

The positioning of the starter magnetic switch or the electromagnetic switch is complicated since the positioning of the switch can interfer with the various engine accessory parts. Therefore, thse parts are designed to change the size or arrangement upon a design change of the switch. However, it is frequently difficult to redesign these parts because sufficient space must be maintained between the parts for rearranging or rewiring the starter magnetic switch. In addition, the magnetic switch must be equipped with thick wires because the wires are used to carry a large current to turn on the starter motor circuit. However, the thick wires are hard to handle.

SUMMARY OF THE INVENTION

The present invention has been conceived in view of the background thus far described. One object is to provide a battery to be mounted on a vehicle, which includes a space for the starting magnetic switch and for its wiring. The present invention provides a battery that can be mounted on a vehicle such that the battery casing is formed with a recess in which a starter magnetic switch can be fitted.

A second object is to provide an electromagnetic switch which can be firmly fixed on the battery such that it is not mounted in a restricted space while being free from interfering with the battery wires.

One feature of the present invention is a battery to be mounted on a vehicle, such that the battery casing is formed with a recess into which a starter magnetic switch is fitted. Another feature of the invention is a starter magnetic switch which can be fitted in a recess formed in a battery. The starter magnetic switch has a rocker means which is made of a conductive material. The rocker means has a moving electric contact which is biased normally open and which is closed when the solenoids built into the switch are magnetized, to close the drive circuit of a starter motor. The rocking means has one end projecting to the outside of a switch casing and is fastened to the positive terminal of the battery. In addition, a supporting means, which projects to the outside of the switch casing at the side opposed to the portion where the rocking means projects, is fastened to the negative terminal of the battery. The rocking means is arranged such that the portion fastened to the positive terminal of the battery and the portion to be attracted by the solenoids are offset while holding a generally parallel relationship not in a common plane.

According to the second feature of the present invention, the battery casing is formed with a recess in which the starter magnetic switch is fitted. This makes it unnecessary to independently retain the space for arranging the starter magnetic switch so that there is an increased degree of freedom for arranging the engine accessory parts. Moreover, the cables for connecting the battery and the starter magnetic switch can be shortened or omitted when the contacts between the battery and switch are directly connected. The elimination of the cables means that the voltage drop due to the cable connection is decreased, and therefore, reliability is improved.

Another feature of the present invention is an electromagnetic switch which is provided with a magnetized coil. The magnetizable coil is magnetized to attract a plunger by turning on a starter switch after the main power source circuit of a vehicle has been turned on by a key switch. A fixed contact disposed at one end of a first fixed contact member is connected electrically with a battery. A second fixed contact disposed at a second end of the second fixed contact member is connected electrically with a starter motor circuit. The first and second contact members are rendered electrically conductive to start a starter motor by means of a movable contact member made movable together with the plunger. The first fixed contact member has at its outer end a first connecting terminal for acting as a supporting member projecting to the outside of the electromagnetic switch casing and is connected electrically and mechanically to the positive terminal of the battery in a direct manner and has at a substantially middle portion thereof has a second connecting terminal branched from the middle portion and connected electrically with a load circuit of the vehicle. The second fixed contact member is equipped at its end with a third connecting terminal projecting to the outside of the casing and connected electrically with the starter motor circuit. The first connecting terminal is fixedly connected electrically and mechanically with positive terminal of the battery, and the supporting member projecting from the one end of the casing is insulated electrically from the negative terminal of the battery.

The first connecting terminal of the first fixed contact member of the electromagnetic switch is connected directly and electrically with the positive terminal of the battery to make it unnecessary to handle the battery cables. In addition, the electromagnetic switch is mounted in its entirety on the battery by mounting and supporting the supporting of the casing of the electromagnetic switch on the negative terminal of the battery so that any special member, such as a bracket for mounting the electromagnetic switch, can be dispensed with to simplify the mounting structure and strengthen the mounted state.

DESCRIPTION OF THE DRAWINGS

FIG. 2 is a partial longitudinal section of the first feature showing the starter magnetic switch is fitted in the battery;

FIG. 3 is a section taken along line III—III of FIG. 2;

DESCRIPTION OF THE PREFERRED EMBODIMENTS

Figure 1:
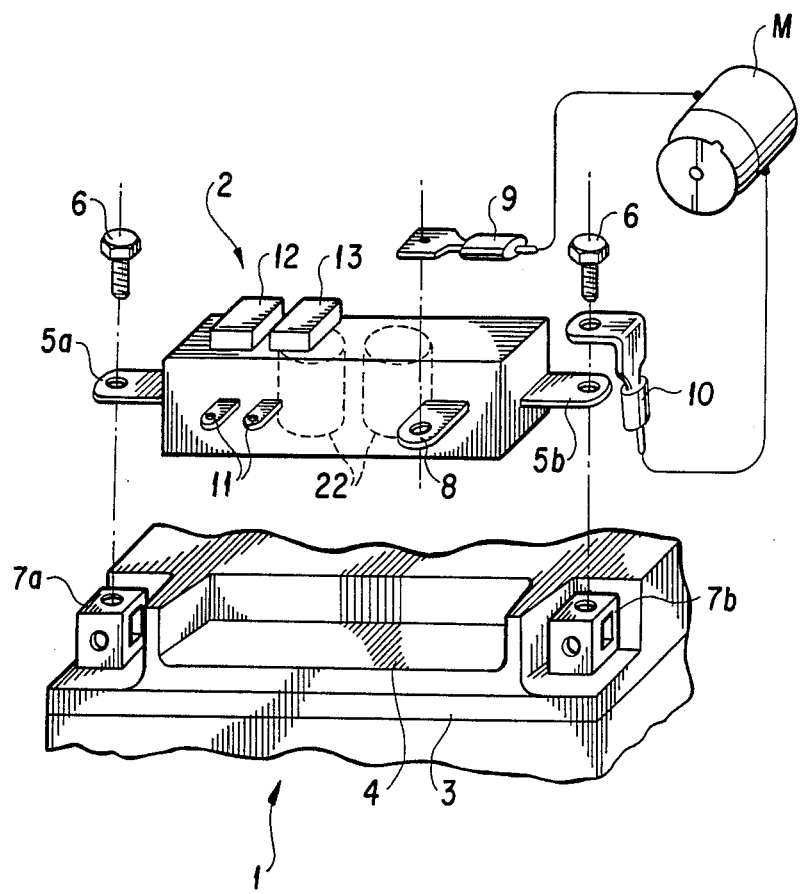
FIG. 1 is an exploded perspective view of the first embodiment of the present invention showing a battery and starter magnetic switch located above the battery.

The first feature of the present invention will be described with reference to FIGS. 1-3. In these figures, numeral 1 denotes a battery to be mounted on a vehicle, such as a motorcycle, and numeral 2 denotes a starter magnetic switch (which will be hereinafter referred to as the switch).

A cover 3 for a battery casing is formed at its upper side with a recess 4 into which the switch 2 is fitted. Terminals 5a and 5b extend from the two ends of the switch 2 and are fixed to battery terminals 7a and 7b by bolts 6 to fix the switch 2 to the battery 1. Therefore, terminals 5a and 5b fix the switch 2 into the recess of the cover 3 of the battery 1.

Terminal 5a of the switch 2, is located at the left hand side of FIGS. 1 and 2. The terminal is a positive terminal of a main circuit. The terminal is electrically connected directly to the plus terminal 7a of the battery 1 when terminal 5a is fixed to the battery 1. Terminal 5b of the switch 2 is located at the right hand side of the drawings and is a metallic supporting member which is supported by, but insulated from the casing so that it does not constitute an electric contact. The terminal 5b is the so-called "dummy terminal" and only functions to fix the switch 2 to the battery 1.

The main circuit in switch 2 also includes a negative terminal 8 which projects from the side of the switch 2 to the outside at an angle of 90° with respect to the dummy terminal 5b. One end of a cable 9 is connected to terminal 8 and the other end of cable 9 is connected to a self-starter M.

The negative terminal 7b of the battery 1 together with terminal 5b of the switch 2 are fixed to one end of cable 10 by a bolt 6. The other end of cable 10 is connected to the self-starter M. Numeral 11 denotes terminals which are formed to project from the side of the switch 2 to the outside such that the inner ends are electrically connected with solenoids 22 mounted in the switch 2. Terminals 11 outer ends are electrically connected with a starter button through a cable (not shown). Numeral 12 denotes a fuse inserted into the main circuit, and numeral 13 denotes a spare fuse.

The switch 2 will now be described in detail. As shown in FIG. 2, the switch 2 is mostly composed of the following: a casing 21; the solenoids 22 (two of which are shown, but may be changed according to design) which are fixed on the bottom plate of the casing 21. An arm 23 the ends of which are arranged in a parallel relationship that is not in a common plane, the arm 23 is made of a magnetic material and which is riveted to the inner end of the casing of terminal 5a such that it is attracted downward by the solenoids 22 when the solenoids 22 are magnetized and is returned to its upper position by its own elastic action when the solenoid 22 are de-magnetized. A contact 24 is fixed on the lower side of the leading end of the arm 23 and a contact 25 is mounted on terminal 8 to face the contact 24.

The casing 21 is made of double structure which is constructed of an outer casing 26 and an inner casing 27 fitted to bite their abutting portions. At the portion of the casing 21 to which the terminals 5a, 5b, 8 and 11 extends, there is a sealed member 28 positioned between the inner casing and the outer casing 26. The sealing member 28 prevents foreign particles, such as water droplets or dust, from entering into the casing 21. Numeral 29 is a tension spring which assists the downward attraction of the arm 23 by the magnetized solenoids 22 by pulling the arm 23 downward thereby holding the contacts 24 and 25 in their closed position.

Spring 29 is not limited to a tension spring but may denote a compression spring. If a compression spring is used, the spring 29 would normally hold the contact 24 of the arm 23 away from the contact 25 and only allow contacts 24 and 25 to be in their closed position while the solenoids 22 are magnetized.

The operation of the battery 1 and starter magnetic switch 2 will now be described.

In order to start an engine, a main switch (not shown) is turned on, and the starter button is actuated to magnetize the solenoids 22 in the switch 2. In response to the magnetization of solenoids 22, the arm 23 is attracted downward, as indicated by the solid lines in FIG. 2, to move the contacts 24 and 25 to the closed position so that the self-starter can be electrically connected with the battery 1 to start the engine. When the starter button is released from its depressed position after the engine starts, the solenoids 22 are de-energized to move the contacts 24 and 25 to an open position so that the power supplied to the self-starter is interrupted.

The battery casing is formed with recess 4 into which the starter magnetic switch 2 is fitted. It is therefore unnecessary to retain an additional space for mounting the starting magnetic switch 2 other than the space required for arranging the battery. As a result, the layout space for arranging other engine accessory parts can be accordingly expanded.

Since the switch 2 is fitted into battery 1, measures used to prevent vibration of the battery 1 also prevent vibrations of the switch 2. This will reduce the number of vibration preventing parts, when compared with the prior art measures needed for exclusively preventing vibrations to the starter magnetic switch.

Since the plus temrinal 5a of switch 2 is fastened directly to the positive terminal 7a of the battery 1 by the bolt 6, the voltage drop in the prior art due to the cable connections between the switch and the battery can be eliminated since no cables are necessary with the present invention.

The recess 4 for fitting the switch 2 therein is not limited to always being formed in the cover 3, as in the afore-mentioned feature, but may be formed in the casing body itself.

A second feature of the present invention will be described with reference to FIGS. 4-6.

Figure 4:
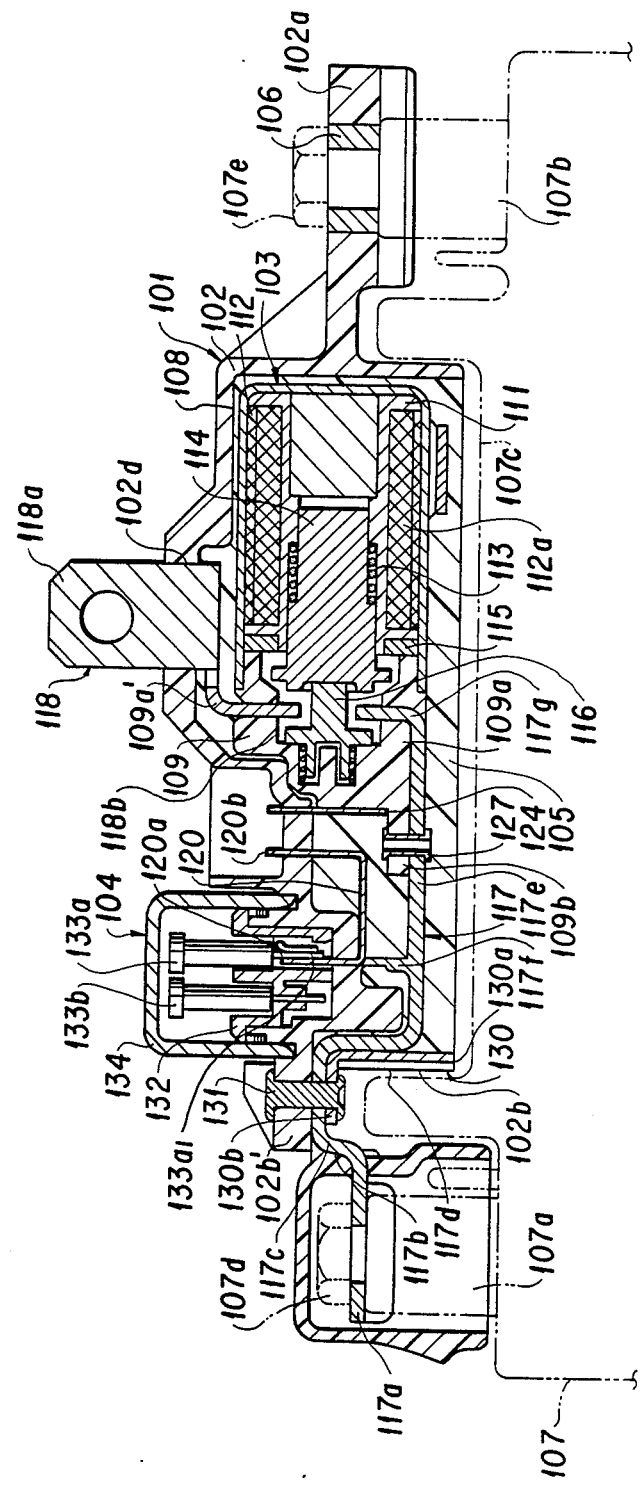
FIG. 4 is a longitudinal section showing the second feature of the electromagnetic switch to which the present invention is applied.
Figure 5:
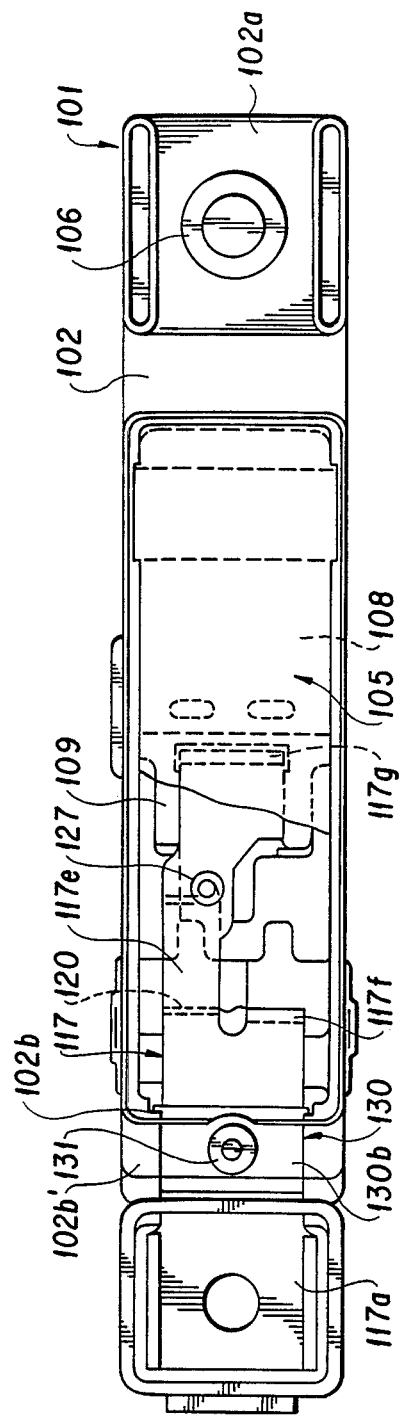
FIG. 5 is a partial cut away bottom view of FIG. 4.

FIGS. 4 and 5 are a longitudinal section and a bottom view of the second feature showing an electromagnetic switch. In these two figures, numeral 101 denotes a electromagnetic switch which is constructed by mounting its body portion 103 (hereinafter referred to as body) in a casing 102. The body 103 is sealed in the casing 102 by filling the inside of the casing 102 with an epoxy resin 105.

The casing 102 is made of a heat resisting resin material such as polybutylene terephthalate (i.e., PBT) and is formed into a rectangular shape which has its entire bottom open. The casing 102 is formed with a supporting member 102a at a first longitudinal end. The first longitudinal end projects horizontally from the casing 102 to the outside so that the casing 102 may be mounted on and supported by a negative terminal 107b of a later described battery 107. The second longitudinal end of casing 102 has an opening 102b. At the upper end of the opening 102b, a projection 102b' projects horizontally to the outside. A ring-shaped reinforcing member 106, which is made of metal, is fixed in a generally central portion of the supporting member 102a. The opening 102b is closed by a vertical portion 130a of a cover member 130 having an inverted L-shaped section 130a. The cover member 130 has a horizontal portion 130b positioned at a predetermined distance from the lower side of the second longitudinal end projection 102b' of the casing 102.

The body 103 is composed mainly of the following: a first fixed contact member 117 which is electrically connected with the battery 107; a second fixed contact member 118 which is electrically connected with the starter motor circuit; a magnetizable coil 112 which is made by winding a coil 112a on a bobbin 111 having a yoke 115 attached thereto; a plunger 114 which is slidably fitted in the magnetizable coil 112 and biased in one direction (i.e., in an open direction or leftward of FIG. 4) by the action of a return spring 113; and a moving contact member 116 which is movable with the sliding movement of the plunger 114 for electrically turning on (i.e., closing) or off (i.e., opening) the two fixed contact members 117 and 118.

Figure 6:
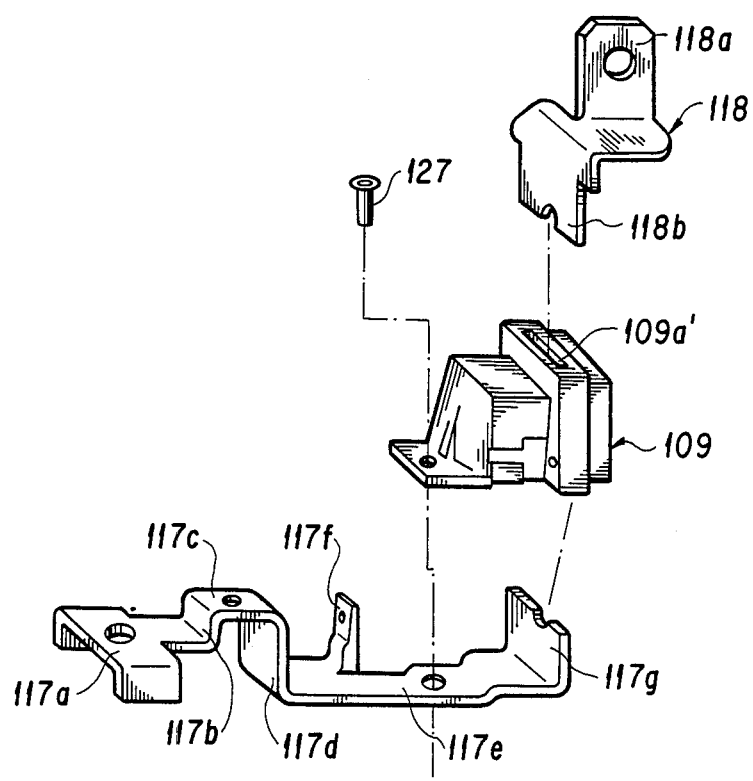
FIG. 6 is an exploded perspective view showing the cover and the fixed contact members of the second feature.

The first fixed contact member 117 is made by bending a slender, conductive metal plate, as shown in FIG. 6, and is composed of a horizontal first connecting terminal 117a which is formed at one longitudinal end. A horizontal first mounting wall 117c extends from the first connecting terminal 117a through a vertically rising first mounting wall 117b. A horizontal second mounting wall 117e extends from the mounting wall 117c through a vertically dropping second vertical wall 117d. A second connecting terminal 117f extends from the second horizontal second mounting wall 117e vertically upward and which is positioned at a longitudinally middle portion of the second mounting wall 117e and at a widthwise middle portion of the same. A fixed contact 117g extends vertically upward from the end portion of the second mounting wall 117e.

The second fixed contact member 118 is made by bending a conductive metal plate, as shown in FIG. 6, and is composed of a second connecting terminal 118a which extends vertically upward from one end of the second fixed contact member 118. A fixed contact 118b extends vertically downward from the other end of the fixed contact member 118 such that the contact 118b is integrally formed with the third connecting thermal 118a.

The magnetizable coil 112, plunger 114 and moving contact member 116 are arranged in the casing 102 in a portion closer to the first longitudinal end rather than in the longitudinal central portion of the casing 102. They are assembled and mounted in a space which is defined by a bottomed cylindrical case 108 and a cover 109 which is firmly fixed on the open end of the case 108.

The first fixed contact member 117 has a first connecting terminal 117a which projects to the outside of the second longitudinal end of the casing 102. Fixed contact member 117 has a first mounting wall 117c clamped between the projection 102b' of the casing 102 and the horizontal portion 130b of the cover member 130. The first mounting wall 117c, horizontal portion 130b and projection 102b' are fixed to the casing 102 by a rivet 131. The second vertical wall 117d, second mounting wall 117e, second connecting terminal 117f and fixed contact 117g are positioned inside the casing 102 by positioning the lower extended side of cover 109 closer to the first longitudinal end of the casing 102 then from the longitudinal central portion of the casing 102 and positioned along the upper side of the second mounting wall 117e closer to the fixed contact 117g than from the longitudinal central portion of the casing. The so-positioned parts are fixed to the casing 102 by a grommet 127 which is fitted in the projection 109b which extends horizontally from the lower portion of the one end of the cover 109.

The second connecting terminal 117f of the first fixed contact member 117 is electrically connected with one end 120a of an electric load terminal 120 of the vehicle through a later described fuse device 104. The other end 120b of the load terminal 120 projects to the outside of the upper side of the longitudinal middle portion of the casing 102. The fixed contact 117g of the first fixed contact member 117 is inserted into the cover 109 from a lower hole 109a.

The second fixed contact member 118 is mounted in the casing 102 above the case 108 and has a third connecting terminal 118a projecting to the outside from an upper hole 102d of the casing 102. The second fixed contact member 118 is connected with the connecting terminal (which is not shown) of the starter motor circuit. The fixed contact 118b is inserted the cover 109 from an upper hole 109a' and opposed at a predetermined spacing to the fixed contact 117g. The fixed contacts 117g and 118b are rendered electrically conductive through the movable contact member 116 which is moved together with the plunger 114 toward the supporting member 102a (i.e., rightward in FIG. 4), when the switch is turned on (i.e., closed) so that moving contact member 116 is brought into abuttment with the fixed contacts 117g and 118b to rendered them electrically conductive.

The terminal of the coil 112a of the magnetizable coil 112 is connected through a connecting pin (not shown) with two coil terminal 124 (only one is shown), which have their upper ends projecting to the outside of the upper side of the casing 102. The projecting end of one coil terminal 124 is connected with the starter motor circuit through a cable (not shown) while the projecting end of the other coil terminal 124 is connected with the load circuit of the main switch through a cable and a starter switch (the two switches are not shown).

The fuse device 104 is constructed by a covering a plurality of blade fuses 133a and 133b which are fitted and held in a fuse guide 132 formed on the upper side of the casing 102 with a cover 134. The main side blade fuse 133a has one connecting terminal 133a₁ connected electrically with the one end of the load terminal 120 of the vehicle. The other end 120b of the load terminal 120 is connected with the load circuit of the vehicle through a cable and the main switch (neither are shown).

The electromagnetic switch 101 is fixedly mounted on the upper side of the battery 107 by fitting the casing 102 in a recess 107c formed in the upper side of the battery 107. The switch 101 is mounted by fitting the respective holes of the first connecting terminal 117a and a supporting member 102a in the electrode terminals 107a and 107b of the battery 107, and by fastening the first connecting terminal 117a and the supporting member 102a by bolts 107d and 107e. Thus, the first connecting terminal 117a is electrically connected with the positive terminal of the battery 107. However, the reinforcing member 106 is a middle member which is electrically insulated from the casing 102 so that it does not provide any electrically contact.

The operation of the electromagnetic switch 101 thus constructed is as follows.

When the engine is started, the main switch is turned on, and the starting switch (these two switches are not shown) is then actuated to magnetize the magnetizable coil 112 of the electromagnetic switch 101. The plunger 114 is pulled into the bobbin 111 against the biasing force of the return spring 113. The moving contact member 116 comes into abutment against the fixed contact 117g of the first fixed contact member 117 and the fixed contact 118b of the second fixed contact member 118 so that these two fixed contacts 117g and 118b are electrically conductive so that electromagnetic switch 101 is turned on. As a result, the starter motor circuit is closed to start the starter motor (neither are shown).

When the starter switch is released from its depressed state after the engine is started, the magnetizable coil 112 is released from its magnetization so that the moving contact member 116 moves away from the fixed contacts 117g and 118b so that the power supplied to the starter motor is interrupted.

The first advantage of the second embodiment is that the electromagnetic switch 101 is assembled in the recessed 107c formed in the battery 107. As a result, there is no need to retain any additional space for mounting the electromagnetic switch 101, and therefore, the layout space for arranging the other engine accessory parts can be accordingly increased.

A second advantage to this electromagnetic switch 101, is that the first connecting terminal 117a, which is attached to the second longitudinal end of the casing 102, and the supporting member 102a of the casing 102 are fastened to the electrode terminals 107a and 107b of the battery 107 by bolts 107d and 107e respectively. As a result, the electromagnetic switch 101 can be mounted to a negative terminal of a battery 107 without any special provisions such as a special member, special fastening means or a bracket.

A third advantage of the present invention is that the connecting terminals of the electromagnetic switch are connected directly to the positive terminal of the battery, and therefore, eliminate the need for any cables.

The present invention may be embodied in other specific forms without departing from the spirit or essential characteristics thereof. The presently disclosed embodiments are therefore, to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. An electromagnetic switch and battery comprising:
   a battery for mounting on a vehicle, said battery having a battery casing formed with a recess means therein for mounting said electromagnetic switch, said battery having two terminals;
   said recess means being formed in an upper portion of the battery casing of said battery, between said two terminals of said battery;
   a partition interposed between said electromagnetic switch and said two terminals, said partition being integral with said battery casing;
   switch casing means for holding said electromagnetic switch, said switch casing means being formed with a first and a second end;
   supporting means projecting from said first end of said switch casing means, said supporting means being electrically insulated from a negative terminal of said battery;
   a magnetizable coil mounted in said switch casing means;
   plunger means slidably fitted in said magnetizable coil;
   moving contact means movable with a sliding movement of said plunger means such that said magnetizable coil is magnetized to attract said plunger means when a starter switch is turned on after a main power source circuit of a vehicle has been turned on by a key switch; and
   first and second fixed contact members, said first fixed contact member connected electrically with said battery, said first fixed contact member having a first connecting terminal at a first end thereof which acts as a supporting member projecting to the outside of the second end of said switch casing means, said first connecting terminal being directly connected electrically and mechanically to the positive terminal of said battery, said first fixed contact member also having a second connecting terminal at a middle portion thereof, said second connecting terminal branching from said middle portion and being connected electrically with a load circuit of said vehicle, said first fixed contact member having a fixed contact at a second end thereof, and wherein said second fixed contact member is connected electrically with a starter motor circuit and is equipped at one end thereof with a third connecting terminal projecting to the outside of said switch casing means and connecting electrically with said starter motor circuit, and a second end of said second fixed contact member has a fixed contact wherein said fixed contact of said second fixed contact member and said fixed contact at said second end of said first contact member are rendered electrically conductive to start a starter motor by said movable contact member which moves in response to movement of said plunger means.

2. A starter magnetic switch and battery apparatus for a vehicle, said switch and battery apparatus comprising:
   a battery for mounting on a vehicle, said battery having a battery casing;
   a positive terminal located on said battery;
   a negative terminal located on said battery;
   a recess means formed on the battery casing of said battery for mounting said starter magnetic switch, said recess means being formed in an upper portion of said battery casing between said positive and negative terminals of said battery;
   a partition interposed between said starter magnetic switch and said positive and negative terminals of said battery, said partition being integral with said battery casing;

a switch casing means for holding said starter magnetic switch;

at least one solenoid mounted on said switch casing means;

rocking means made of conductive material, said rocking means having a first and second ends, said first end projecting to the outside of said switch casing means and being fastened to said positive terminal of said battery, said second end being movable;

electric contact means attached to said second end of said rocking means such that said second end and said electric contact means are pulled towards said at least one solenoid when said at least one solenoid is energized to thereby close a drive circuit of a starter motor; and supporting means projecting to the outside of said switch casing means at a side opposed to said first end of said rocking means, said support means being fastened to said negative terminal of said battery.

3. A starter magnetic switch and battery apparatus according to claim 2 wherein said switch casing means for holding said starter magnetic switch has a double casing structure including and outer casing and an inner casing, said inner casing includes two split halves;

said supporting means having no electric connection; and wherein said rocking means and said supporting means are clamped between said two split halves of said inner casing of said switch casing means, and wherein said outer casing is integrally molded of synethic resin to cover said inner casing clamping said rocking means and said supporting means.

4. A starting magnetic switch and battery as set forth in claim 3, wherein said two split halves of said inner casing are fitted to bite their abutting portions, and wherein a sealing member is positioned between said two split halves of said inner casing which clamps said rocking means and said supporting means.

* * * * *